(No Model.)

J. I. McCLUNG.
Cylinder for Thrashing or Hulling.

No. 234,599.    Patented Nov. 16, 1880.

WITNESSES:
F. McArdle.
C. Sedgwick

INVENTOR:
J. I. McClung
BY Munn & Co.
ATTORNEYS.

UNITED STATES PATENT OFFICE.

JAMES I. McCLUNG, OF SIDNEY, OHIO.

CYLINDER FOR THRASHING OR HULLING.

SPECIFICATION forming part of Letters Patent No. 234,599, dated November 16, 1880.

Application filed March 8, 1880. (No model.)

*To all whom it may concern:*

Be it known that I, JAMES IRVING MCCLUNG, of Sidney, in the county of Shelby and State of Ohio, have invented a new and useful Improvement in Cylinders for Thrashing or Shelling Corn or other Grains, of which the following is a specification.

Figure 1:
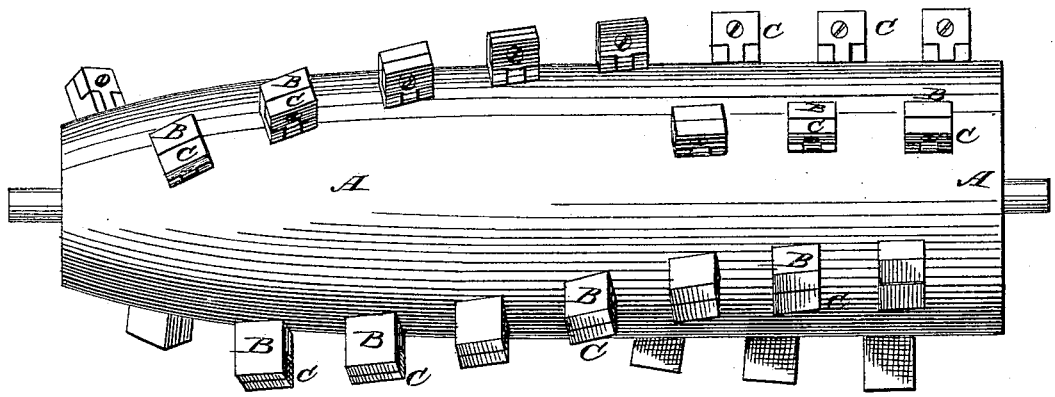
Figure 2:
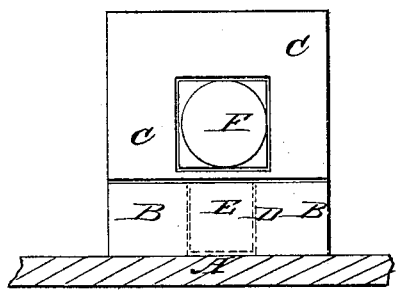
Figure 3:
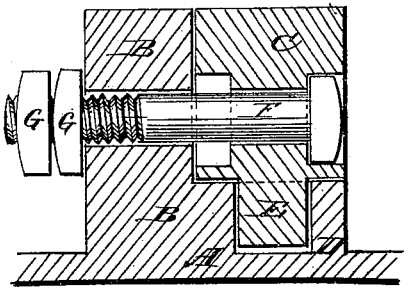
Figure 4:
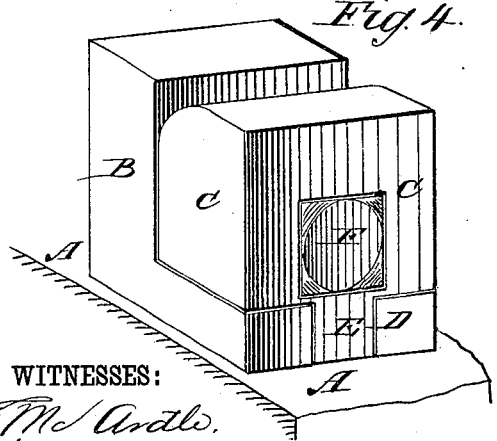
Figure 5:
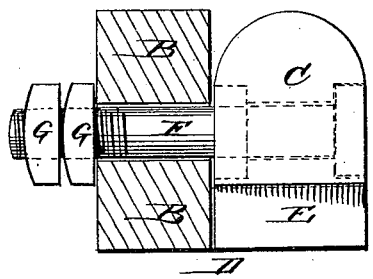

Figure 1 is a plan view of the improvement. Fig. 2 is a face view of one of the teeth. Fig. 3 is a sectional elevation of a tooth. Fig. 4 is a perspective view of one of the teeth half worn out and reversed. Fig. 5 is a side view of a worn-out tooth, the lug being shown in section.

The invention consists in constructing the cylinder with rabbeted and recessed lugs to receive the teeth, and in constructing the teeth with tenons or tongues, whereby the said teeth may be reversed and replaced, and also in the mode of arranging the teeth upon the cylinder to facilitate the shelling and prevent breakage of cobs, as will be hereinafter fully described.

I will describe the improvement as applied to corn-sheller cylinders; but do not limit myself to that use, as it may be applied with advantage to various other shelling and thrashing cylinders.

Similar letters of reference indicate corresponding parts.

A represents the body of the cylinder, which is made in the usual manner, and upon which are cast lugs B. The lugs B are rabbeted upon the forward side to form seats for the teeth C. In the base of the lugs B are formed recesses D, which may be made in the form of sockets, as shown in Figs. 2 and 3, or in the form of grooves, as shown in Figs. 4 and 5, to receive tenons or tongues E formed upon the bases of the teeth C. The teeth C are further secured to the lugs B by bolts F, which pass through holes in the teeth C and in the lugs B, and are secured in place by nuts G, screwed upon their ends. The teeth C are countersunk upon both sides, as shown in Fig. 3, to receive the heads of the bolts F. By this construction the teeth C will be held in place by a single bolt. By this construction, also, when the forward edge of the teeth becomes worn, the teeth can be reversed by removing the bolts F, so as to again present a square edge, as shown in Fig. 4. By this construction, also, when both edges become worn, as shown in Fig. 5, the teeth can be readily detached and replaced by new teeth without its being necessary to remove the cylinder A from the machine.

Upon the cylinder A, for one-third its length from the smaller end, the lugs and teeth B C are arranged at about a half-twist. For the second or middle third the lugs and teeth B C are arranged at about a one-fourth twist. For the last third, at the larger end of the cylinder, the lugs and teeth B C are arranged nearly straight or parallel with the length of the cylinder. The largest or rear end of the cylinder is also provided with extra or intermediate rows of teeth, as shown in Fig. 1. By this mode of arranging the lugs and teeth the corn will be taken at a more rapid rate when it first enters the machine, and more slowly as it becomes partially shelled. By this mode of arranging the lugs and teeth a much smaller per cent. of the cobs will be broken than when the teeth are arranged in the usual manner.

Having thus fully described my invention, I claim as new and desire to secure by Letters Patent—

1. The combination of the teeth C, having tongues E and countersunk on both sides, the cylinder A, having rabbeted and recessed lugs B, the bolts F, and the nuts G, as shown and described.

2. The combination, with the cylinder A, of the rabbeted and recessed lugs B, the teeth C, having tenons or tongues E, and the bolts F, substantially as herein shown and described, whereby the teeth may be reversed and replaced, as set forth.

JAMES IRVING McCLUNG.

Witnesses:
JASPER N. NUTT,
I. H. STUDEVANT.